US010994662B2

(12) United States Patent
Salter et al.

(10) Patent No.: US 10,994,662 B2
(45) Date of Patent: May 4, 2021

(54) TIE-DOWN BRACKET FOR MOTOR VEHICLE

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Kevin Berington Johnson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/427,738

(22) Filed: May 31, 2019

(65) Prior Publication Data
US 2020/0377025 A1    Dec. 3, 2020

(51) Int. Cl.
| | |
|---|---|
| *B60R 9/04* | (2006.01) |
| *B60R 9/06* | (2006.01) |
| *B60R 9/08* | (2006.01) |
| *B60P 7/08* | (2006.01) |
| *B60Q 1/00* | (2006.01) |
| *B60Q 1/26* | (2006.01) |

(52) U.S. Cl.
CPC ............. *B60R 9/04* (2013.01); *B60P 7/0807* (2013.01); *B60Q 1/0023* (2013.01); *B60Q 1/2611* (2013.01); *B60R 9/06* (2013.01); *B60R 9/08* (2013.01)

(58) Field of Classification Search
CPC . B60R 9/04; B60R 9/08; B60P 7/0807; B60Q 1/2611; B60Q 1/2696; B60Q 1/0023
See application file for complete search history.

(56) References Cited

U.S. PATENT DOCUMENTS

| | | | | | |
|---|---|---|---|---|---|
| 2,555,805 | A | * | 6/1951 | Miller ................... | B63B 21/045 114/218 |
| 2,787,435 | A | * | 4/1957 | Shields ................ | A47G 1/1686 248/307 |
| 3,259,353 | A | * | 7/1966 | Webb .................... | B60P 7/0807 410/116 |

(Continued)

FOREIGN PATENT DOCUMENTS

| | | |
|---|---|---|
| CN | 203172547 U | 9/2013 |
| CN | 106122816 A | 11/2016 |
| FR | 2592133 A3 | 6/1987 |

OTHER PUBLICATIONS amazon.com, "Deuce-Style Dual LED White Amber Running Light Turn Signal Smoke Lens (1157 Bulb, White Amber LED)" Automotive. Downloaded from https://www.amazon.com/Deuce-Style-White-Amber-Running-Signal/dp/B079QLYHJ4/ref=sr_1_fkmmull_1?keywords=Deuce+style+dual+LED+white+amber+running+light+turn+signal+smoke+lens&qid=1557770419&s=gateway&sr=8-1-fkmrnull on Apr. 4, 2019.

(Continued)

*Primary Examiner* — Justin M Larson
(74) *Attorney, Agent, or Firm* — David Coppiellie, Esq.; Carlson, Gaskey & Olds, P.C.

(57) ABSTRACT

A vehicle assembly includes, among other things, a tie-down bracket including a latch pivotably coupled to a body. A method includes, among other things, securing a tie-down line to a tie-down bracket of a vehicle. The method further includes monitoring a load applied to the tie-down bracket.

19 Claims, 7 Drawing Sheets

(56) References Cited

U.S. PATENT DOCUMENTS

| | | | | |
|---|---|---|---|---|
| 4,072,113 | A * | 2/1978 | Thurston | B60P 7/0876 24/115 K |
| 4,126,095 | A * | 11/1978 | Tillery | F16G 11/00 24/132 R |
| 4,469,261 | A * | 9/1984 | Stapleton | B60R 9/045 224/321 |
| 4,650,382 | A * | 3/1987 | Johnson | B60P 7/0815 410/110 |
| 4,819,139 | A | 4/1989 | Thomas | |
| 4,850,769 | A * | 7/1989 | Matthews | B60P 7/0815 410/105 |
| 4,936,724 | A * | 6/1990 | Dutton | B60P 7/0815 296/100.18 |
| D310,017 | S * | 8/1990 | Matthews | D8/356 |
| 5,077,643 | A | 12/1991 | Leach | |
| 5,431,472 | A * | 7/1995 | Coffland | B60R 9/00 224/403 |
| 5,533,848 | A * | 7/1996 | Davis | B60P 7/0815 410/104 |
| 5,618,140 | A * | 4/1997 | Okland | B60P 7/0815 410/101 |
| 5,641,106 | A | 6/1997 | Slaughter et al. | |
| D382,533 | S * | 8/1997 | Okland | D12/414 |
| 5,827,024 | A * | 10/1998 | Davenport | B60P 7/0815 410/110 |
| 5,829,377 | A * | 11/1998 | Hoppenhaus | B63B 21/045 114/218 |
| 5,967,719 | A * | 10/1999 | Davenport | B60Q 3/30 410/101 |
| 5,971,684 | A * | 10/1999 | Wang | B60P 7/0807 410/107 |
| 6,002,350 | A * | 12/1999 | Checa | B64D 9/003 212/276 |
| D460,039 | S * | 7/2002 | Smith | D12/414 |
| 6,565,300 | B2 * | 5/2003 | Herring | B60P 7/0815 29/270 |
| 7,281,889 | B2 * | 10/2007 | Anderson | B60P 7/0815 410/102 |
| 7,600,954 | B2 * | 10/2009 | Marcott | B60P 7/0807 410/102 |
| 7,723,935 | B2 * | 5/2010 | Kneller | B64D 11/003 318/286 |
| 7,758,290 | B2 * | 7/2010 | Boggenstall | B64D 9/003 410/80 |
| 8,057,081 | B2 | 11/2011 | Schwab | |
| 8,167,180 | B2 | 5/2012 | Bogoslofski et al. | |
| 8,225,679 | B2 * | 7/2012 | Flaherty | B60R 9/058 73/862.21 |
| 8,469,558 | B2 | 6/2013 | Carmi | |
| 8,607,418 | B2 * | 12/2013 | Ebbenga | B63B 21/08 24/134 L |
| 8,801,245 | B2 * | 8/2014 | De Wind | E05B 85/10 362/511 |
| 9,480,866 | B2 * | 11/2016 | Pollard | A62B 35/0075 |
| 9,656,750 | B2 * | 5/2017 | Fischer | B64D 9/00 |
| 9,797,432 | B2 * | 10/2017 | Inkavesvaanit | F16B 45/02 |
| 9,969,232 | B2 | 5/2018 | Salter et al. | |
| 10,239,439 | B2 * | 3/2019 | Cooper | B60P 7/0861 |
| 10,315,555 | B2 * | 6/2019 | Bruhn | G01G 19/12 |
| 10,351,052 | B2 * | 7/2019 | Dingman | B60Q 3/267 |
| 10,717,381 | B2 * | 7/2020 | Chu | G01L 5/103 |
| 2003/0039526 | A1 * | 2/2003 | Yuan | B60P 7/0807 410/107 |
| 2004/0066328 | A1 * | 4/2004 | Galley, III | G06Q 10/08 342/357.75 |
| 2004/0145203 | A1 * | 7/2004 | Caputi | A45F 5/1026 294/170 |
| 2005/0239450 | A1 * | 10/2005 | Wesby | H04M 1/275 455/418 |
| 2006/0226188 | A1 | 10/2006 | Smith | |
| 2011/0149560 | A1 | 6/2011 | Jessup et al. | |
| 2012/0031939 | A1 * | 2/2012 | Jutila | B60Q 1/24 224/326 |
| 2013/0249252 | A1 | 9/2013 | Schmid et al. | |
| 2015/0049500 | A1 | 2/2015 | Sakarian et al. | |
| 2015/0210391 | A1 * | 7/2015 | Fischer | B63B 25/004 224/401 |
| 2017/0129383 | A1 * | 5/2017 | Bika | G01L 5/047 |
| 2019/0381359 | A1 * | 12/2019 | Polig | G01P 15/02 |
| 2020/0079271 | A1 * | 3/2020 | Villacres Mesias | F16B 45/02 |

OTHER PUBLICATIONS

Abell Hobby, Realistic 1/10 Front Bumper with LED Lights & Towing Hooks for SCX-10 40mm Mount (C25539SILVERBLACK), Downloaded from https://www.abellhobby.com/Realistic-1-10-Front-Bumper-with-LED-Lights-p/intc25539silverblack.htm on Apr. 4, 2019.

Oliver, J. Brent, "Hooked On My Escape," Downloaded from www.hookedonmyescape.com on Apr. 4, 2019. Copyright 2012-2015.

Oak Orchard Canoe Kayak Experts, "Wonder Bar Roof Rack," Downloaded from https://www.pakorchardcanoe.com/wonderbar.php on Apr. 4, 2019. Copyright 1999-2019.

* cited by examiner

TIE-DOWN BRACKET FOR MOTOR VEHICLE

TECHNICAL FIELD

This disclosure relates to a tie-down bracket for a motor vehicle.

BACKGROUND

Users often transport items such as luggage, canoes, kayaks, bicycles, skis, etc., by securing them to the roof of a vehicle. Such items may be secured to the roof using tie-down lines anchored to tie-down brackets.

SUMMARY

A vehicle assembly according to an exemplary aspect of the present disclosure includes, among other things, a tie-down bracket including a latch pivotably coupled to a body.

In another exemplary embodiment of the foregoing assembly, the latch is configured to pivot back and forth between a latched position and an unlatched position. The latch in the latched position completes a circumferential perimeter of an opening of the tie-down bracket. The latch in the unlatched position provides a gap in the circumferential perimeter.

In another exemplary embodiment of any of the foregoing assemblies, the latch is biased toward the latched position.

In another exemplary embodiment of any of the foregoing assemblies, the gap is configured to permit a tie-down line to move into the opening without threading the tie-down line through the opening.

Another exemplary embodiment of any of the foregoing assemblies includes a sensor configured to detect a position of the latch relative to the body when the latch is in a latched position relative to the body.

In another exemplary embodiment of any of the foregoing assemblies, the sensor is a capacitive sensor.

In another exemplary embodiment of any of the foregoing assemblies, the body includes a pivot section and an engagement section. The latch is pivotably coupled to the pivot section. The latch is engaged with the engagement section when the latch is in a latched position. The latch is disengaged from the engagement section when the latch is in an unlatched position.

Another exemplary embodiment of any of the foregoing assemblies includes a sensor configured to detect a position of the latch relative to the engagement section when the latch is in the latched position.

In another exemplary embodiment of any of the foregoing assemblies, when the latch is in the latched position, a hook on one of the latch or the engagement section is engaged with a bar on the other of the latch or the engagement support portion. Further, when the latch is in the unlatched position, the hook is disengaged from the bar.

In another exemplary embodiment of any of the foregoing assemblies, the hook opens vertically upward.

In another exemplary embodiment of any of the foregoing assemblies, the latch is configured to pivot back and forth between the latched position and the unlatched position. The latch in the latched position completes a circumferential perimeter of an opening of the tie-down bracket. The latch in the unlatched position provides a gap in the circumferential perimeter. The latch is biased toward the latched position.

Another exemplary embodiment of any of the foregoing assemblies includes a light of the tie-down bracket.

In another exemplary embodiment of any of the foregoing assemblies, the light is configured to illuminate to visually indicate a load on the tie-down bracket.

A method according to another exemplary aspect of the present disclosure includes, among other things, securing a tie-down line to a tie-down bracket of a vehicle. The method further includes monitoring a load applied to the tie-down bracket.

In another exemplary embodiment of the foregoing method, the tie-down line extends through an opening of the tie-down bracket when the tie-down line is secured to the tie-down bracket. The method further includes pivoting a latch of the tie-down bracket from a latched position to an unlatched position to provide a gap in a circumferential perimeter of the opening. The gap permits the tie-down line to move into the opening during the securing.

Another exemplary embodiment of any of the foregoing methods includes pivoting the latch from the unlatched position back to a latched position where the latch completes the circumferential perimeter of the opening.

Another exemplary embodiment of any of the foregoing methods includes, during the monitoring, sensing a position of the latch relative to another portion of the tie-down bracket.

Another exemplary embodiment of any of the foregoing methods includes sensing the position using a capacitive sensor.

Another exemplary embodiment of any of the foregoing methods includes illuminating a light in response to the load.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a tie-down bracket for a motor vehicle. The tie-down bracket can include a latch that permits movement of a tie-down line into an opening of the tie-down bracket without needing to thread the tie-down line through the opening. Loads on the tie-down bracket can be monitored.

Figure 1:
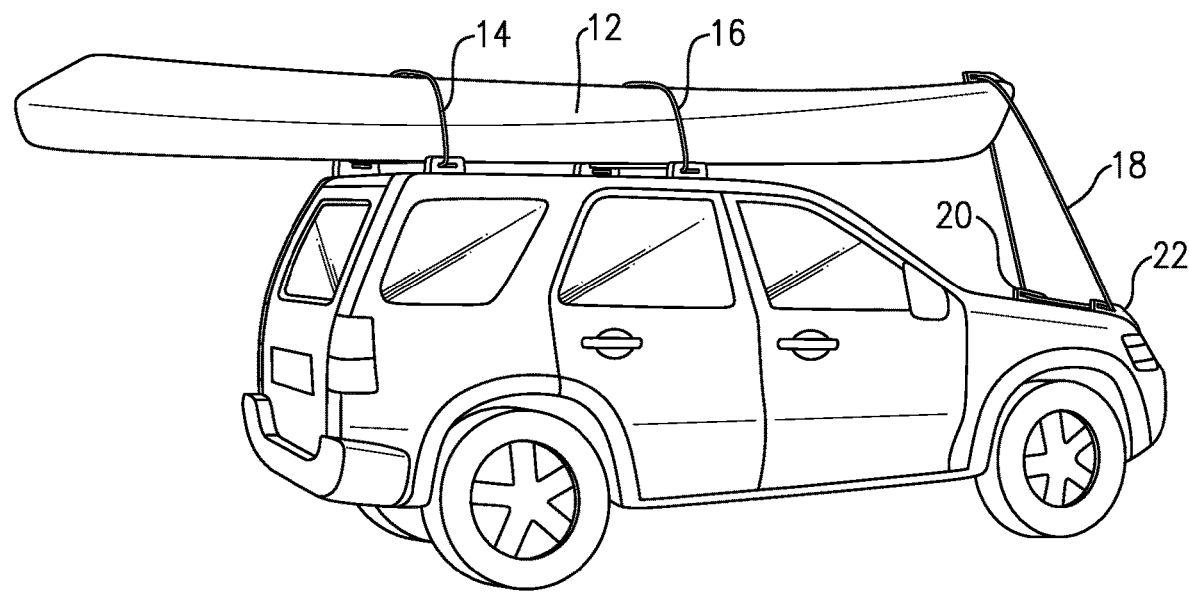
FIG. 1 is a rear-perspective view of a motor vehicle with an item secured to a roof.

Referring to the drawings, FIG. 1 is a rear-perspective view of a motor vehicle 10. While an SUV is pictured in FIG. 1, this disclosure is also applicable to other types of vehicles.

In FIG. 1, an item 12, which in this example is a kayak, is secured to a roof of the vehicle 10 using tie-down lines, such as ropes, cables, straps, cords, etc. In this example, there are three tie-downs lines 14, 16, 18 holding the item 12 in place. First and second tie-downs 14, 16 are connected to a roof rack of the vehicle 10. The front tie-down line 18 is connected to a body of the vehicle 10 by way of first and second tie-down brackets 20, 22. While two tie-down brackets 20, 22 are shown in FIG. 1, it should be understood that this disclosure extends to vehicles with one or more tie-down brackets. The detail of one of the tie-down brackets will be described below, however it should be understood that first and second tie-down brackets 20, 22 are substantially identical.

Figure 2:
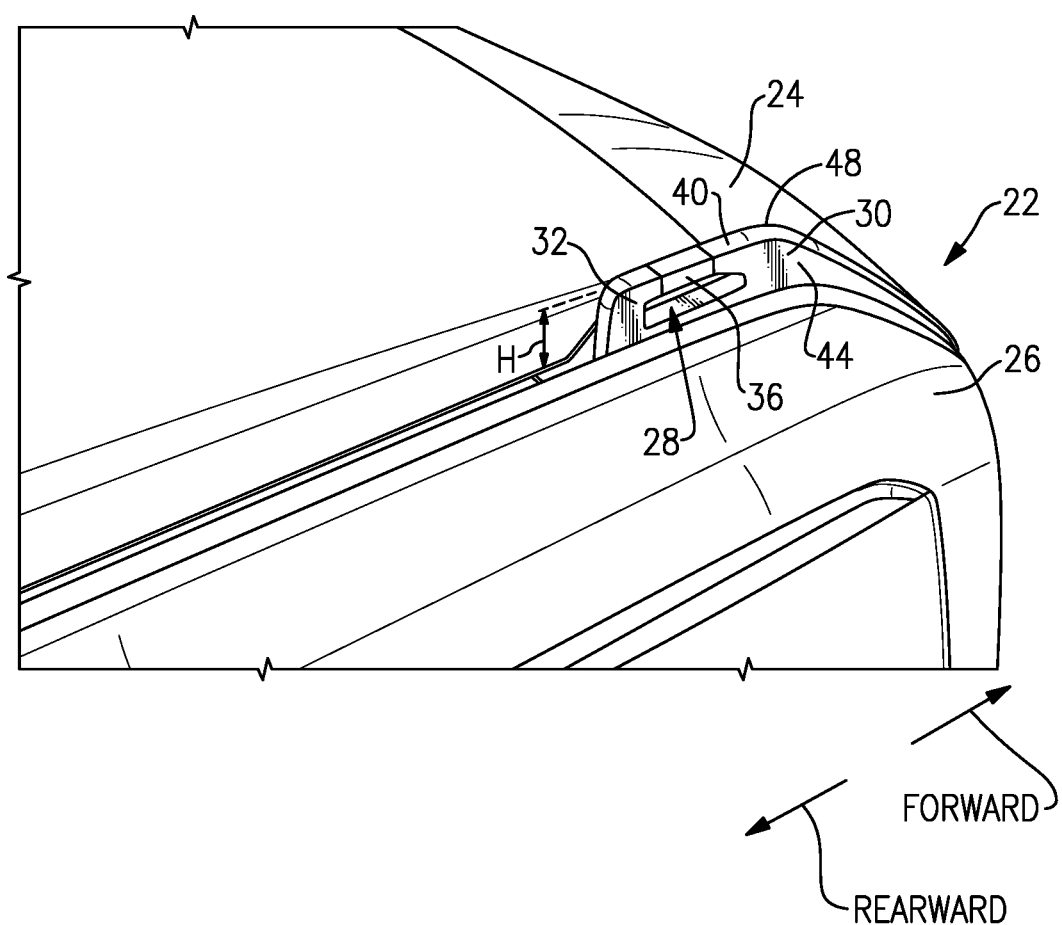
FIG. 2 is a rear-perspective view of an example tie-down bracket with a latch of the tie-down bracket in an engaged position.
Figure 3:
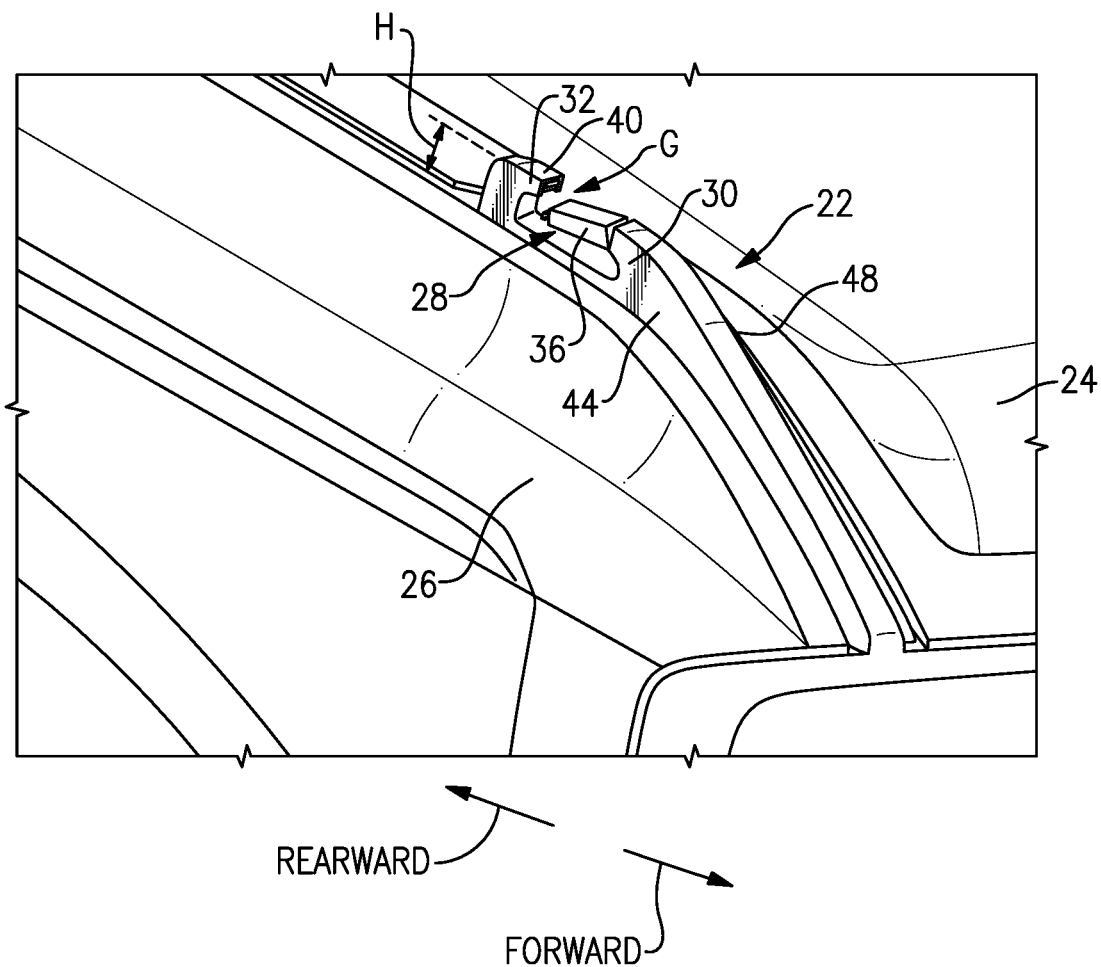
FIG. 3 is a front-perspective view of the tie-down bracket with the latch of the tie-down bracket in a disengaged position.

FIGS. 2 and 3 illustrate the tie-down bracket 22 in more detail. The "forward" and "rearward" directions are labeled in FIGS. 2 and 3 for ease of reference. The "forward" and "rearward" directions correspond to the normal "forward" and "rearward" orientations of the vehicle 10.

In this example, the tie-down bracket 22 is arranged in a space between a hood 24 and a front quarter panel 26 of the vehicle 10. It should be understood that the tie-down bracket 22 may be arranged in other locations, however. When the hood 24 is closed, as in FIGS. 2 and 3, the tie-down bracket 22 projects above the hood 24 and the front quarter panel 26. The tie-down bracket 22 includes an opening 28 configured to receive a tie-down line, such as tie-down line 18.

In an aspect of this disclosure, the tie-down bracket 22 is selectively removable and/or replaceable. In particular, a user could selectively remove the tie-down bracket 22 and replace it with another type of tie-down bracket. Such tie-down brackets may be aftermarket accessories or included on the factory model of the vehicle 10.

The tie-down bracket 22 includes a body or base portion, which may be a one-piece or multi-piece body. The exemplary body includes a pivot section 30 and an engagement section 32. The tie-down bracket 22 further includes a latch 36. In FIG. 2, the latch 36 is in a latched position. In FIG. 3, the latch 36 is in an unlatched position. The latch 36 is pivotably coupled to the body/base portion and is pivotable relative to the body/base portion back and forth between the latched position and the unlatched position.

In this example, the pivot section 30 is substantially coterminous with a front of the hood 24 and a front of the front quarter panel 26. A length dimension of the tie-down bracket 22 extends between the pivot section 30 and the engagement section 32, and further extends substantially parallel to a vehicle centerline. The opening 28 extends through the tie-down bracket 22 in a direction substantially normal to the vehicle centerline and to the length dimension of the tie-down bracket 22. The pivot section 30 and the engagement section 32 are inclined relative to one another, in this example. In particular, the engagement section 32 is substantially parallel to a ground surface, and the pivot section 30 is inclined such that the tie-down bracket 22 slopes toward the ground surface approaching a front surface of the vehicle 10.

The latch 36 is, in particular, pivotably coupled to the pivot section 30 of the body. The latch 36 engages the engagement section 32 when the latch 36 is in the engaged position. The latch 36 is disengaged from the engagement section 32 when the latch 36 is in the disengage position.

When the latch 36 is in the latched position, the latch 36 completes a circumferential perimeter of the opening 28. The latch 36 in the disengaged position provides a gap G in the circumferential perimeter of the opening 28. A user can move the tie-down line 18 through the gap G into the opening 28 when securing the tie-down line 18 to the tie-down bracket 22. The tie-down line 18 can be moved through the gap G to position the tie-down line 18 within the opening 28 rather than threading the tie-down line 18 through the opening 28 in a direction substantially normal to the vehicle centerline. After the tie-down line 18 is positioned within the opening 28, the latch 36 can move back to the latched position.

The latch 36 can be biased toward the latched position by, for example, a spring-biasing force provided by a spring. To move the latch 36 to the unlatched position, the user can press the latch 36 vertically downward. The biasing force then snaps the latch 36 back to the latched position after the force is removed. Due to the latch 36, the tie-down bracket 22 is considered a carabiner tie-down bracket.

The tie-down bracket 22 includes a superior (i.e., top) surface 40 extending between a lateral (i.e., outer side) surface 44 and a medial (i.e., inner side) surface 48. The tie-down bracket 22 projects above the hood 24 when the hood 24 is closed by a height dimension H. The height dimension H extends from a top of the hood 24 to the superior surface 40. The height dimension H is substantially constant along the engagement section 32 and the latch 36. The height dimension H gradually reduces in dimension throughout the pivot section 30.

Although the exemplary embodiment includes the pivot section 30 forward the engagement section 32, other examples could include the engagement section 32 forward the pivot section 30.

With reference now to FIGS. 4-9, the exemplary tie-down bracket 22 includes an overmold 50 and a frame 54. The overmold 50 can be, for example, a polymer based material, such as glass filled nylon. In some examples, depending on requirements, carbon fiber could provide portions of the overmold 50.

The frame 54 can be a metal or metal alloy material, such as a stainless steel material. The frame 54 can reinforce the overmold 50.

Weld nuts 58 are used to secure the tie-down bracket 22 to the vehicle 10. Reinforcements, such as catwalk reinforcements, can be used to strengthen the securing of the tie-down bracket 22 to the vehicle 10.

A latch pivot pin 62 is used to pivotably couple the latch 36 to the pivot section 30. The latch pivot pin 62 directly couples the frame 54 of the latch 36 to the frame 54 of the pivot section 30. A spring 64 is disposed about a portion of the latch pivot pin 62 and biases the latch 36 to the latched position.

The frame 54 of the latch 36 includes a hook 66. When the latch 36 is in the latched position, the hook 66 engages a bar 70. The frame 54 of the engagement section 32 holds the bar 70. When the latch 36 is in the unlatched position, the hook 66 is disengaged from the bar 70. The hook 66 opens vertically upward in this example.

Securing the tie-down line 18 to the tie-down bracket 22 can apply a load to the tie-down bracket 22. The exemplary tie-down bracket 22 incorporates features to monitor the load.

In particular, the tie-down bracket 22 includes a sensor 74, which is a capacitive sensor in this example. The sensor 74 is, in the exemplary embodiment, held by the overmolded portion of the engagement section 32.

The sensor 74 can measure a distance D between the sensor 74 and the latch 36. That is, the sensor 74 is configured to detect a position of the latch 36 relative to the engagement section 32 when the latch 36 is in the latched position. An end portion 76 of the latch 36 can be flared to facilitate the latch 36 impacting measurements taken by the sensor 74.

Figure 10:
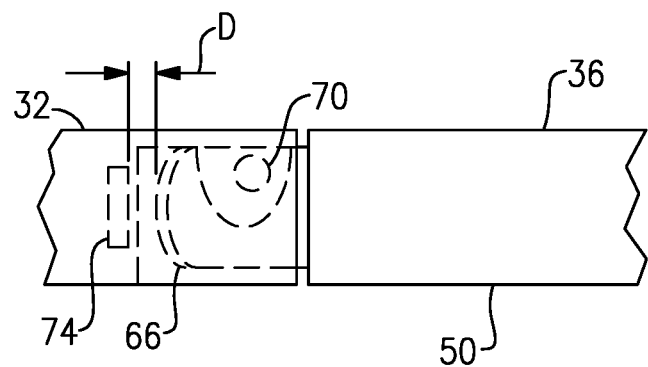
FIG. 10 illustrates a close-up view of the latch in an engaged position when a first load is applied to the tie-down bracket.
Figure 11:
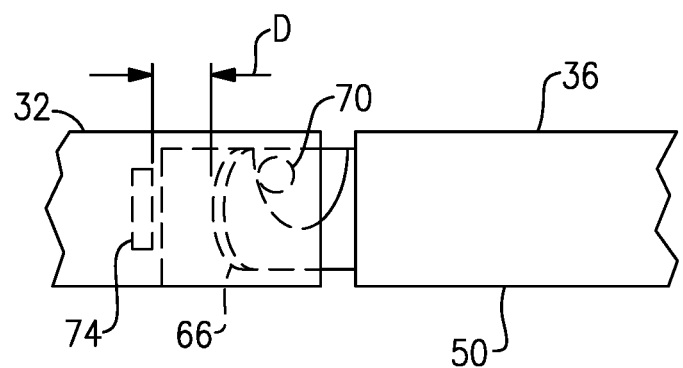
FIG. 11 illustrates the close-up view of FIG. 10 when a greater, second load is applied to the tie-down bracket.

As a load is applied to the tie-down bracket 22, the distance D can increase. For example, FIG. 11 shows a load applied to the tie-down bracket 22 that is higher than the load applied to the tie-down bracket 22 shown in FIG. 10. Due to the higher load, the distance D in FIG. 11 is greater than the distance D in FIG. 10. The variation in the distance D causes the sensor 74 to provide a different signal.

Notably, portions of the overmold 50 are vertically above the sensor 74, which can help to protect the sensor 74 from snow, ice, rain, etc. and to prevent such elements from impacting readings taken by the sensor 74.

In an exemplary embodiment, the readings taken from the sensor 74 can be interpreted by a controller of the vehicle 10 to assess an amount of stress on the tie-down bracket 22.

Figure 4:
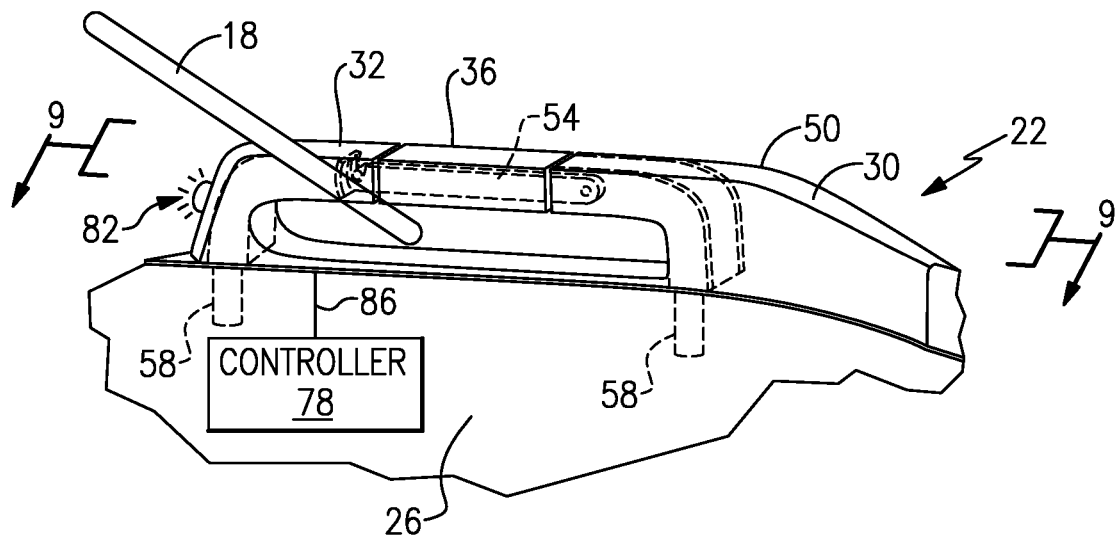
FIG. 4 is a close-up, and partially schematic view, of the tie-down bracket secured to the motor vehicle.
Figure 5:
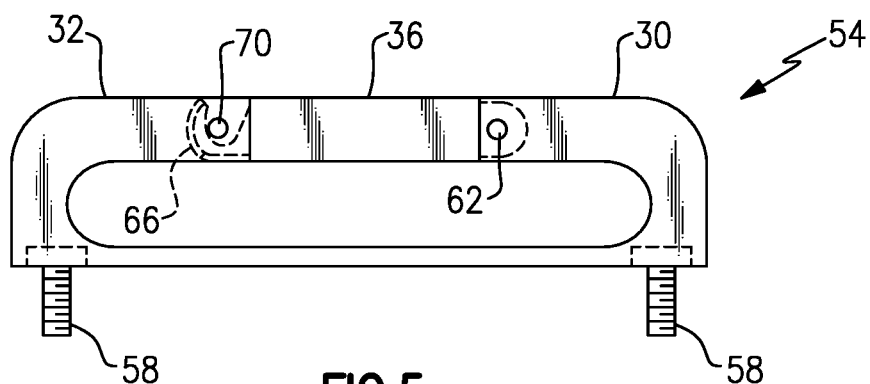
FIG. 5 illustrates a side view of a reinforcement of the tie-down bracket.
Figure 6:
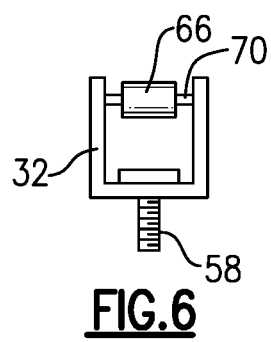
FIG. 6 illustrates an end view of the reinforcement of FIG. 5.
Figure 7:
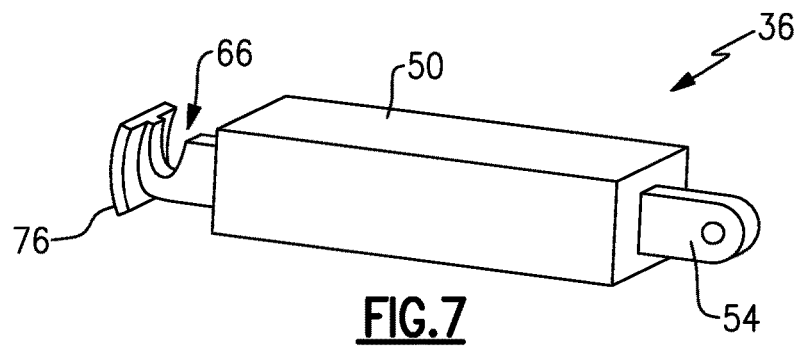
FIG. 7 illustrates a perspective view of the latch of the tie-down bracket.
Figure 8:
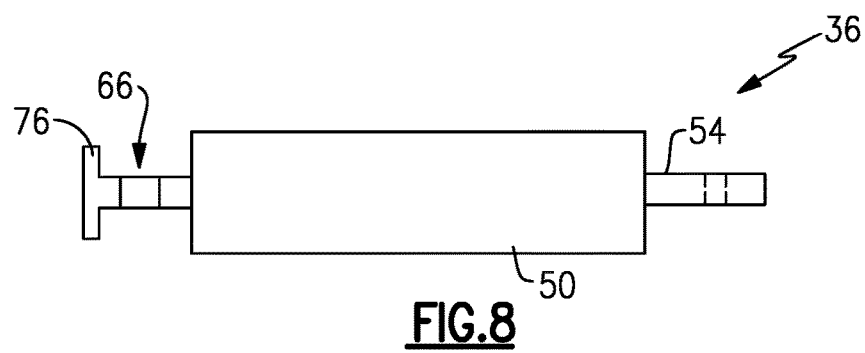
FIG. 8 illustrates a top view of the latch of the tie-down bracket.
Figure 9:
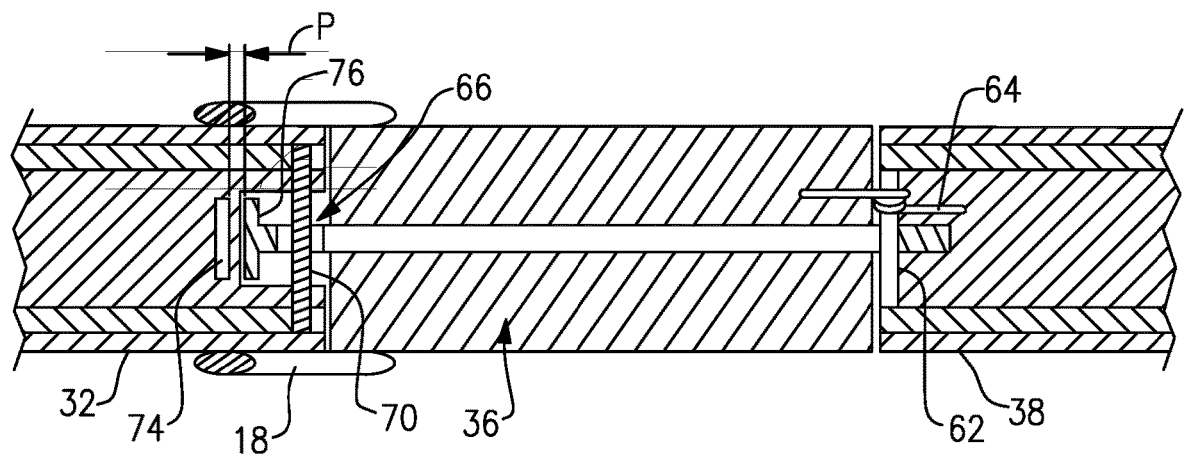
FIG. 9 illustrates a section view of the tie-down bracket taken at line 9-9 in FIG. 4.

Such a controller 78 is illustrated schematically in FIG. 4. It should be understood that the controller 78 could be part of an overall vehicle control module, such as a vehicle system controller (VSC), or may be part of a body control module (BCM). Alternatively, the controller 78 may be a stand-alone controller separate from the VSC and the BCM. Further, the controller 78 may be programmed with executable instructions for interfacing with and operating the various components of the vehicle 10. The controller 78 additionally includes a processing unit and non-transitory memory for executing the various control strategies and modes of the vehicle system.

Based on the amount of stress on the tie-down bracket 22, the controller can command a lighting element to illuminate. The lighting element can be, for example, one or more light emitting diodes (LED) 82 disposed within the tie-down bracket 22 or elsewhere on the vehicle 10. The lighting element could be something other than an LED in other examples.

The LED 82 can be illuminated in red if the stress on the tie-down bracket 22 is above a threshold value. The LED 82 can be illuminated in amber if the stress on the tie-down bracket 22 is close to the threshold value, say 75% or above of the threshold value. The LED 82 can be illuminated in green if the stress on the tie-down bracket 22 is less than 75% of the threshold value. Via the LED 82, the user can view stress on the tie-down bracket 22 in real time. The placement of the LED 82 as shown in FIG. 4 can allow a user within a passenger compartment of the vehicle 10 to view the LED 82.

In this example, the controller 78 is electronically connected to the sensor 74 and the LED 82 via an interface 86. The interface 86 is shown schematically in FIG. 4, and is representative of a controller area network (CAN), a local interconnect network (LIN), or a wireless connection such as a Bluetooth® low energy (BLE) connection. A user may be permitted to provide inputs to the controller 78 via a human-machine interface, such as a mobile phone or an infotainment system of the vehicle 10. In that example, the interface 86 is connected to the human-machine interface as well. The interface 86 can include portions that are overmolded within the tie-down bracket 22.

Figure 12:
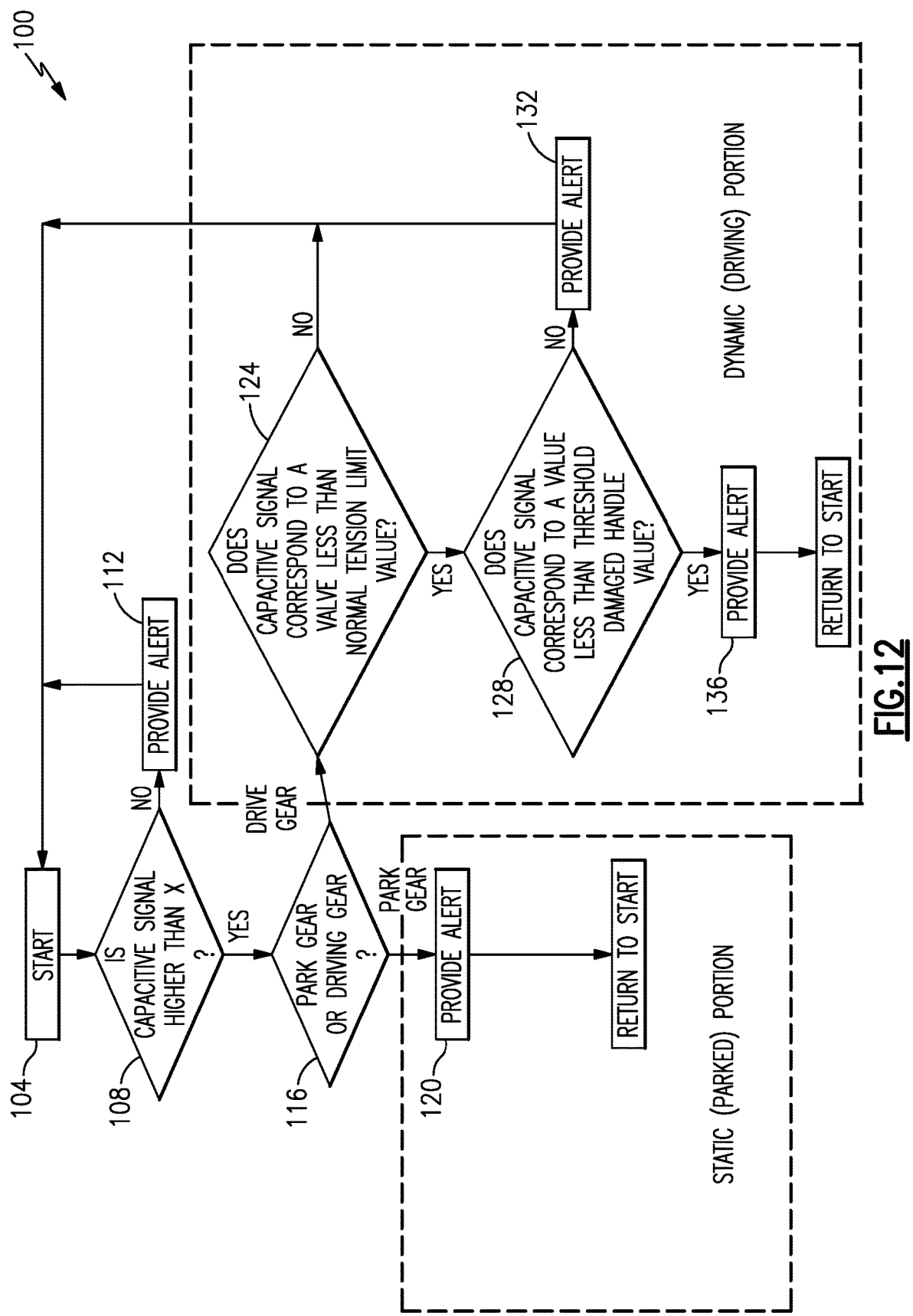
FIG. 12 illustrates the flow of a method used in connection with the tie-down bracket of FIGS. 1-11.

With reference to FIG. 12, an exemplary method 100 used in connection with the tie-down bracket 22 begins at a step 104 where the tie-down line 18 is not secured to the tie-down bracket 22. Next at a step 108, the method 100 determine whether a capacitive signal from the sensor 74 is higher than a threshold value. The step 108 provides a check to assess whether or not the latch 36 is disengaged, or whether a portion of the tie-down bracket 22 is damaged. When the latch 36 is engaged, not damaged, and unloaded, the capacitive signal will be relatively high.

If the capacitive signal is not higher than the threshold value, the method 100 moves to the step 112, which provides an alert. The alert can notify a user to check for damage or to determine if the latch 36 is jammed in a disengaged position. The alert can be, for example, a message displayed on a touch screen within the vehicle 10. The alert could instead, or additionally, include using the LED 82 to provide a particular lighting sequence, such as flashing the LED in a red color.

If the capacitive signal is higher than the threshold value, the tie-down line 18 is secured to the tie-down bracket 22. The method 100 then moves to the step 116, which assess whether or not the vehicle 10 is in a park gear or a driving gear. If the vehicle 10 is in the park gear, the method 100 moves to a step 120.

At the step 120, the LED 82 is kept green if measurements taken by the sensor 74 are calculated by the controller 78 to mean that the tie-down bracket 22 is experiencing a normal amount of stress, say below 75% of a maximum stress threshold value. The controller 78 commands the LED 82 to be amber if the stress is from 75% to 85% of the maximum stress threshold value, and commands the LED 82 to be red if the stress is greater than 85% of the maximum stress threshold value. The method 100 returns from the step 120 to the start 104.

If, at the step 116, the vehicle 10 is in a driving gear, the method 100 moves to a step 124, where the capacitive signal from the sensor 74 is assessed to determine whether or not the capacitive signal is less than a threshold, normal tension limit value. If the capacitive signal is not less than the threshold, normal tension limit value, the method 100 moves from the step 124 to the start 104. If the capacitive signal is less than the threshold, normal tension limit value, the method 100 moves from the step 124 to a step 128.

At the step 128, the method 100 assesses whether or not the capacitive value is less than a threshold, damaged handle value. If not, the method 100 moves to the step 132 where the controller 78 communicates an alert. The alert can include turning the LED to an amber color, displaying a message within a display of the passenger compartment, or both. The alert can notify a driver to consider maneuvering more slowly to reduce peak stress levels on the tie-down bracket 22.

If, at the step 128, the capacitive value is less than a threshold, damaged handle value, the method 100 moves to a step 136, which displays a damaged handle alert. The damaged handle alert can include turning the LED to a red color, flashing the LED, displaying a message within the passenger compartment, or some combination of these. The method 100 moves from the step 136 to the start 104.

As discussed in connection with the method 100 described above, the capacitive signal from the sensor 74 can increase as more tension is applied to the tie-down bracket 22. The LED 82, or another lighting device, can be a visual indicator of tension applied to the tie-down bracket 22 by the tie-down line 18. The method 100 may leave some room for dynamic stress variations while driving without providing the alerts.

Some features of the disclosed examples include monitoring a load applied to a tie-down bracket and providing an alert, such as illuminating a lighting device, depending on the load.

A reinforcement of the tie-down bracket can be metal or metal alloy. The reinforcement can be used to both to strength a latch of the tie-down bracket as well as enhance the sensitivity of a sensor used on connection with the tie-down bracket. Sensitivity can be increased by, among other things, flaring an end of the reinforcement to increase surface area next to the sensor.

Lighting devices, such as RGB LEDs, can be positioned in, for example, a rear surface of the tie-down bracket. The lighting devices can indicate a load on the tie-down bracket when tightening a tie-down line to the tie-down bracket and while vehicle is not moving A method used in connection with the tie-down bracket can detect a damaged tie-down bracket or an open latch of a tie-down bracket. The stress on the tie-down bracket during loading, unloading, or tightening can be represented by a dynamic/unstable capacitive signal in normal range. The method can wait for the signal to stabilize for, say one second, unless the signal goes too low, which may indicate that the tie-down light has been overtightened.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a tie-down bracket including a latch pivotably coupled to a body, the body of the tie-down bracket secured directly to a vehicle; and a controller and sensor configured to detect a position of the latch relative to the body when the latch is in a latched position relative to the body in order to monitor the load applied to the tie-down bracket.

2. The vehicle assembly of claim 1, wherein the latch is configured to pivot back and forth between a latched position and an unlatched position, the latch in the latched position completing a circumferential perimeter of an opening of the tie-down bracket, the latch in the unlatched position providing a gap in the circumferential perimeter.

3. The vehicle assembly of claim 2, wherein the latch is biased toward the latched position.

4. The vehicle assembly of claim 1, wherein the sensor is a capacitive sensor.

5. The vehicle assembly of claim 1, wherein the body includes a pivot section and an engagement section, the latch pivotably coupled to the pivot section, the latch engaged with the engagement section when the latch is in a latched position, the latch disengaged from the engagement section when the latch is in an unlatched position.

6. The vehicle assembly of claim 5, wherein, when the latch is in the latched position, a hook on one of the latch or the engagement section is engaged with a bar on the other of the latch or the engagement support portion, wherein, when the latch is in the unlatched position, the hook is disengaged from the bar.

7. The vehicle assembly of claim 5, wherein the latch is configured to pivot back and forth between the latched position and the unlatched position, the latch in the latched position completing a circumferential perimeter of an opening of the tie-down bracket, the latch in the unlatched position providing a gap in the circumferential perimeter, the latch biased toward the latched position.

8. The vehicle assembly of claim 5, further comprising a light of the tie-down bracket.

9. The vehicle assembly of claim 8, wherein the light is configured to illuminate to visually indicate a load on the tie-down bracket.

10. The vehicle assembly of claim 1, wherein the body is rigidly fixed to the vehicle, and the body is configured to remain stationary relative to the vehicle.

11. The vehicle assembly of claim 1, wherein the body is mechanically fastened to the vehicle at a position between a hood and a front quarter panel of the vehicle.

12. The vehicle assembly of claim 1, where the body is immoveable relative to the vehicle when the body is secured directly to the vehicle.

13. The vehicle assembly of claim 1, wherein the body includes an overmold that is polymer-based and a frame that is a metal or metal alloy.

14. A method, comprising:
securing a tie-down line to a tie-down bracket of a vehicle;
monitoring a load applied to the tie-down bracket, wherein the tie-down line extends through an opening of the tie-down bracket when the tie-down line is secured to the tie-down bracket;
pivoting a latch of the tie-down bracket from a latched position to an unlatched position to provide a gap in a circumferential perimeter of the opening, the gap permitting the tie-down line to move into the opening during the securing; and
during the monitoring, sensing a position of the latch relative to another portion of the tie-down bracket to monitor the load applied to the tie-down bracket.

15. The method of claim 14, further comprising sensing the position using a capacitive sensor.

16. The method of claim 14, further comprising illuminating a light in response to the load.

17. The method of claim 14, wherein the latch of the tie-down bracket is pivotably coupled to a body of the tie-down bracket, the body rigidly fixed to the vehicle.

18. The method of claim 17, wherein the body is mechanically fastened to the vehicle at a position between a hood and a front quarter panel of the vehicle.

19. The method of claim 17, where the body is immoveable relative to the vehicle when the body is secured directly to the vehicle.

* * * * *